United States Patent
Ghannam et al.

(10) Patent No.: US 9,643,554 B2
(45) Date of Patent: May 9, 2017

(54) COLLISION SENSING APPARATUS

(71) Applicant: Ford Global Technologies, LLC, Dearborn, MI (US)

(72) Inventors: Mahmoud Yousef Ghannam, Canton, MI (US); Yeruva Satya Reddy, Farmington, MI (US); Paul Kevin Kula, Farmington Hills, MI (US); Bill Pappas, Oxford, MI (US); Todd N. Clark, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/226,462

(22) Filed: Mar. 26, 2014

(65) Prior Publication Data
US 2015/0274102 A1 Oct. 1, 2015

(51) Int. Cl.
*B60R 19/26* (2006.01)
*B60R 19/48* (2006.01)
*B60R 19/18* (2006.01)

(52) U.S. Cl.
CPC ........... *B60R 19/26* (2013.01); *B60R 19/48* (2013.01); *B60R 2019/1873* (2013.01)

(58) Field of Classification Search
CPC . E21B 2034/002; E21B 34/105; B29C 49/04; A61B 5/15003; A61B 5/150351; H04N 2201/0077; H04N 1/00129; H04N 1/00267; H04N 1/195; H04N 1/3875
USPC .......................................... 293/132; 166/322
See application file for complete search history.

(56) References Cited

U.S. PATENT DOCUMENTS

| | | | | |
|---|---|---|---|---|
| 7,331,415 B2* | 2/2008 | Hawes | ................ | B60R 21/0136 180/274 |
| 7,525,416 B2* | 4/2009 | Mader | ................ | B60R 21/0136 180/274 |
| 7,637,545 B2* | 12/2009 | Takahashi | ............. | B60R 19/483 293/132 |
| 7,734,393 B2* | 6/2010 | Murakami | .......... | B60R 21/0136 293/120 |
| 7,768,381 B2* | 8/2010 | Takafuji | ................ | B60R 19/483 293/107 |
| 7,806,222 B2* | 10/2010 | Takahashi | ........... | B60R 21/0136 180/274 |
| 7,823,683 B2* | 11/2010 | Kiribayashi | ............ | B60R 19/20 180/274 |
| 8,368,523 B2* | 2/2013 | Takahashi | ............. | B60R 19/483 180/274 |

(Continued)

FOREIGN PATENT DOCUMENTS

DE   102012105663 A1   1/2013
JP       200919128 A   8/2009

(Continued)

*Primary Examiner* — Kiran B Patel
(74) *Attorney, Agent, or Firm* — Frank A. MacKenzie; Bejin Bieneman PLC

(57) ABSTRACT

An apparatus includes a closed body having a varied configuration between a first location and at least a second location. The apparatus further includes a pressure sensor coupled to the closed body at the first location. When forces with substantially equal magnitudes are respectively applied to the closed body at different locations between the first and second locations, the closed body respectively translates the forces to substantially equal pressure differentials at the first location.

11 Claims, 2 Drawing Sheets

(56) References Cited

U.S. PATENT DOCUMENTS

| | | | | |
|---|---|---|---|---|
| 8,428,862 | B2* | 4/2013 | Mase | B60R 19/18 |
| | | | | 180/271 |
| 8,463,486 | B2* | 6/2013 | Park | B60R 21/34 |
| | | | | 180/271 |
| 8,653,958 | B2* | 2/2014 | Tanabe | B60R 19/20 |
| | | | | 293/132 |
| 8,935,087 | B2* | 1/2015 | Suzuki | B60R 21/0136 |
| | | | | 701/300 |
| 9,174,595 | B2* | 11/2015 | Ghannam | B60R 19/20 |
| 2007/0181359 | A1* | 8/2007 | Mader | B60R 21/0136 |
| | | | | 180/274 |
| 2012/0029814 | A1* | 2/2012 | Mase | B60R 19/18 |
| | | | | 701/301 |
| 2012/0043783 | A1* | 2/2012 | Todd | B60J 5/042 |
| | | | | 296/187.03 |
| 2012/0104777 | A1* | 5/2012 | Ghannam | B60R 19/34 |
| | | | | 293/133 |
| 2013/0220031 | A1* | 8/2013 | Ghannam | G01L 5/0052 |
| | | | | 73/862.381 |
| 2014/0292557 | A1* | 10/2014 | Ajala | B60R 21/0134 |
| | | | | 342/107 |
| 2016/0068124 | A1* | 3/2016 | Huynh | B60R 19/20 |
| | | | | 293/108 |

FOREIGN PATENT DOCUMENTS

| | | |
|---|---|---|
| JP | 4798459 B2 | 10/2011 |
| KR | 20130102388 A | 9/2013 |
| WO | WO 2013/176652 A1 | 11/2013 |

\* cited by examiner

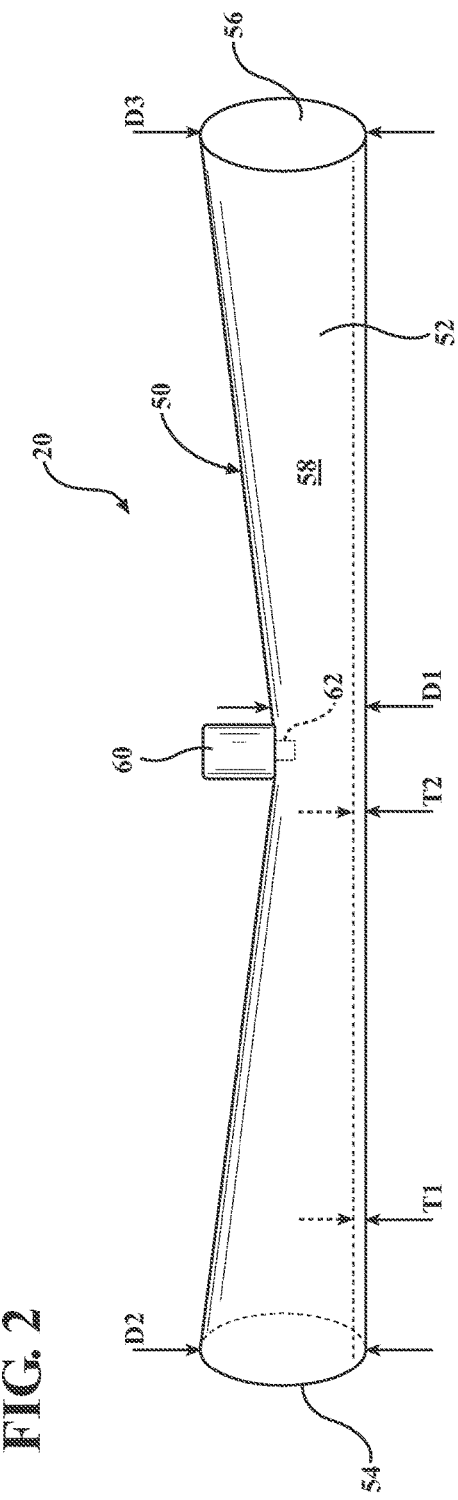

COLLISION SENSING APPARATUS

BACKGROUND

Vehicles, such as automobiles, may include equipment for mitigating the impact of certain collisions, for example, collisions with pedestrians, with such equipment including bumper- or hood-mounted airbags and hood-lifting systems. To control and employ such equipment, the vehicle is required to detect a corresponding collision. Current mechanisms for detecting such collisions suffer from drawbacks including, for example, their complexity and cost.

DRAWINGS

FIG. 2 is an exemplary perspective view of the exemplary sensing apparatus of FIG. 1.

FIG. 3 is an exemplary perspective view of an exemplary sensing apparatus.

DETAILED DESCRIPTION

Figure 1:
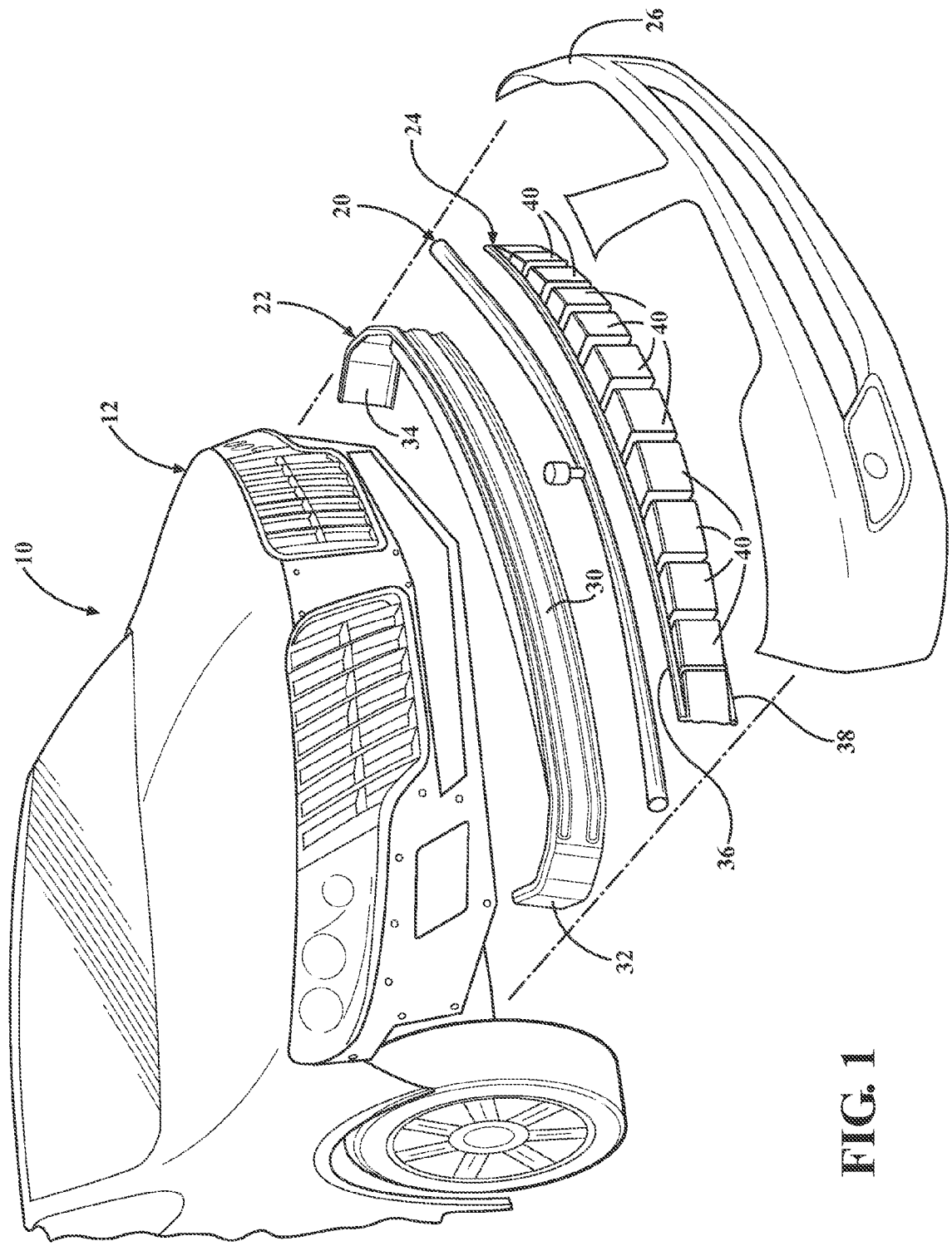
FIG. 1 is a partially exploded perspective view of an exemplary front end of a vehicle, including an exemplary sensing apparatus.

FIG. 1 is an exemplary illustration of a vehicle 10 with a front end 12. The vehicle 10 includes a front bumper assembly 14, illustrated in FIG. 1 in exploded view. The front bumper assembly includes a sensing apparatus 20 disposed between a bumper beam 22 and an energy-absorbing component 24. The front bumper assembly 14 further includes a front fascia component 26.

The bumper beam 22 includes a front face 30 with a curved shape that substantially spans the width of the front end 12 of the vehicle 10. The bumper beam 22 further includes rearward-extending portions 32 and 34 configured to couple to a frame assembly (not shown) of the vehicle 10. The sensing apparatus 20 has a curved shape with an overall width corresponding to the size of the front face 30 of the bumper beam 22. The sensing apparatus 20 extends across the front face 30 of the bumper beam 22 and is fixed in engagement with the front face 30. The bumper beam 22 is a relatively rigid component of a material such as, for example, steel.

The energy-absorbing component 24 includes a rear face 36 sized and shaped to correspond with the front face 30 of the bumper beam 22 and the sensing apparatus 20, such that the sensing apparatus 20 is received between the front face 30 of the bumper beam 22 and the rear face 36 of the energy-absorbing component 24. For example, the energy-absorbing component 24 may include a transverse channel (not shown) across the rear face 36 for engaging the sensing apparatus 20. The energy-absorbing component 24 is fixed to the bumper beam 22, with the rear face 26 overlapping and engaging the sensing apparatus 20. The energy-absorbing component 24 further includes a forward face 38 with a plurality of protrusions 40.

The energy-absorbing component 24 is relatively elastic as compared to the bumper beam 22. For example, the energy absorbing component 24 be a plastic or foam component and the protrusions 40 may be adapted to deform, crush, or flatten in order to absorb kinetic energy in the event of a collision or impact with the front end 12 of the vehicle 10.

The front fascia component 26 overlaps and engages the energy-absorbing component 24 and attaches to the front end 12 of the vehicle 10. The front fascia component 26 is relatively thin as compared to the energy-absorbing component 24, and the front fascia component 26 is elastic as compared to the bumper beam 22. The front fascia component 26 may include material such as, for example, plastic. As such, the sensing apparatus 20 is in mechanical engagement with the exterior of the front fascia component 26. Therefore, a force applied to the front fascia component 26 in a location overlapping or otherwise mechanically engaged with the energy-absorbing component 24 is translated to the sensing apparatus 20.

The vehicle 10 includes a vehicle computer (not shown) in communication with the sensing apparatus 20 that generally includes a processor and a memory, the memory including one or more forms of computer-readable media, and storing instructions executable by the processor for performing various operations, including as disclosed herein. Further, the computer may include more than one computing device, e.g., controllers or the like included in the vehicle 10 for monitoring and/or controlling various vehicle components, e.g., an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc., including the sensing apparatus 20 and collision mitigation equipment. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

FIG. 2 is a perspective view of the exemplary sensing apparatus 20. The sensing apparatus 20 includes a main body 50 having the general shape of an enclosed duct or conduit having a tapering cross-section from the ends thereof to a central portion thereof. The main body 50 includes an elongate main section 52 extending between a first end 54 and a second end 56. The main section 52 and first and second ends 54, 56 enclose an interior volume 58.

The sensing apparatus 20 further includes a pressure sensor 60 coupled to the main body 50 and in fluid communication with the interior volume 58 at a first location 62, the exemplary first location 62 being proximate a central portion of the main body 50.

In one example, the main body 50 of the sensing apparatus 20 has, in part, a cross-sectional width of approximately ½ inches, with an overall width of approximately the width of the vehicle 10. The main body 50 may include materials such as, for example, sheet metal such as steel or aluminum, plastic, and flexible composite.

The main section 52 of the main body 50 defines a cross-sectional width D1 at the first location 62, a cross-sectional width D2 at the first end 54, and a cross-sectional width D3 at the second end 56. The main section 52 has a thickness T1 proximate the first end 54 and a thickness T2 proximate the central portion thereof. In one example, the thicknesses T1 and T2 are the same and the main section 52 maintains a substantially uniform thickness across the width thereof. The cross-sectional size of the main section 52 of the main body 50 varies from cross-sectional width D1 to cross-sectional width D2 between the first location 62 and the first end 54, and varies from cross-sectional width D1 to cross-sectional width D2 between the first location 62 and the second end 56. These variations in cross-sectional width of the main section 52 of the main body 50 correspond with the shapes and configurations of the bumper beam 22, the energy-absorbing component 24 and the front fascia 26. In particular, the size variations along the width of the main section 52 of the main body 50 of the sensing apparatus 20 are calibrated or tuned to respond to a given force applied at any point across the width of the main body 50 with substantially equivalent pressure differentials at the first location 62. For example, while a force applied proximate the first end 54 is spaced further apart from a substantially equivalent force applied proximate the first location 62, the variation in cross-sectional width of the main section 52 of the main body 50 is configured to compensate for the difference in location of application of the forces. Similarly, the variation in cross-sectional width of the main section 52 of the main body 50 of the sensing apparatus 20 may be further configured or adjusted for the shapes and characteristics of the bumper beam 22, the energy-absorbing component 24 and the front fascia component 26.

Therefore, the pressure sensor 60 creates substantially the same pressure signal for a given force, irrespective of the collision or impact location across the front end 12 of the vehicle 10. Through this passive amplification, or selective magnification, of pressures from forces at different locations along the front end 12 of the vehicle 10, the sensing apparatus 20, with a single pressure sensor 60, generates pressure signals from which the vehicle computer may discriminate between objects, so as to further control the operation of collision mitigation equipment and systems.

FIG. 3 is a perspective view of another exemplary sensing apparatus 20' for use in the vehicle 10 as discussed herein with respect to sensing apparatus 20. The sensing apparatus 20' includes a main body 50' having the shape of an enclosed duct or conduit having a tapering cross-section from the central portion thereof to the respective ends thereof. The main body 50' includes an elongate main section 52' extending between a first end 54' and a second end 56'. The main section 52' and first and second ends 54', 56' enclose an interior volume 58'.

The sensing apparatus 20' further includes a pressure sensor 60' coupled to the main body 50' and in fluid communication with the interior volume 58' at a first location 62', the exemplary first location 62' being proximate a central portion of the main body 50'.

The main section 52' of the main body 50' defines a cross sectional width D1' at the first location 62', a cross sectional width D2' at the first end 54', and a cross sectional width D3' at the second end 56'. The main section 52' has a thickness T1' proximate the first end 54' and a thickness T2' proximate the central portion thereof. In one example, the thicknesses T1 and T2 are different and the thickness of the main section 52' varies across the width thereof. The cross sectional size of the main section 52' of the main body 50' varies from cross sectional width D1' to cross sectional width D2' between the first location 62' and the first end 54', and varies from cross sectional width D1' to cross sectional width D2' between the first location 62' and the second end 56'. These variations in cross sectional width and thickness of the main section 52' of the main body 50' correspond with the shapes and configurations of the bumper beam 22, the energy absorbing component 24 and the front fascia 26. In particular, the size variations, including both cross sectional width and thickness variations, along the width of the main section 52' of the main body 50' of the sensing apparatus 20' are calibrated or tuned to respond to a given force applied at any point across the width of the main body 50' with substantially equivalent pressure differentials at the first location 62'. For example, while a force applied proximate the first end 54' is spaced further apart from a substantially equivalent force applied proximate the first location 62', the variation in cross sectional width and thickness of the main section 52' of the main body 50' is configured to compensate for the difference in location of application of the forces. Similarly, the variation in cross sectional width and thickness of the main section 52' of the main body 50' of the sensing apparatus 20' may be further configured or adjusted for the shapes and characteristics of the bumper beam 22, the energy absorbing component 24 and the front fascia component 26.

Therefore, the pressure sensor 60' creates substantially the same pressure signal for a given force, irrespective of the collision or impact location across the front end 12 of the vehicle 10. Through this passive amplification, or selective magnification, of pressures from forces at different locations along the front end 12 of the vehicle 10, the sensing apparatus 20', with a single pressure sensor 60', generates pressure signals from which the vehicle computer may discriminate between objects, so as to further control the operation of collision mitigation equipment and systems.

A sensing apparatus according to the present disclosure may also vary in configuration with variations in shape and/or material composition across the width thereof to provide, alone or in combination with variations in size or thickness as discussed herein with regard to the sensing apparatus 20 and the sensing apparatus 20'. A sensing apparatus according to the present disclosure may include a main body with a variety of cross-sectional shapes, including, for example, circular, elliptical, and rectangular.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
a closed body having a varied configuration between a first location and at least a second location; and
a pressure sensor coupled to the closed body at the first location,
wherein, when forces with substantially equal magnitudes are respectively applied to the closed body at any two or more different locations between the first and second locations, the closed body respectively translates the forces to substantially equal pressure differentials at the first location.

2. The apparatus of claim 1, wherein the varied configuration of the closed body includes at least one of a variation in size, thickness, shape and material composition between the first and location and the second location.

3. The apparatus of claim 1, wherein the closed body has a cross-sectional shape that varies in size between the first location and the second location.

4. The apparatus of claim 3, wherein the cross-sectional shape of the closed body increases in size between the first location and the second location.

5. The apparatus of claim 3, wherein the cross-sectional shape of the closed body decreases in size between the first location and the second location.

6. The apparatus of claim 1, wherein the closed body has a thickness that varies between the first location and the second location.

7. The apparatus of claim 6, wherein the thickness of the closed body increases between the first location and the second location.

8. The apparatus of claim 6, wherein thickness of the closed body decreases between the first location and the second location.

9. The apparatus of claim 1, wherein the closed body has a shape that varies between the first location and the second location.

10. The apparatus of claim 1, the closed body has a material composition that varies between the first location and the second location.

11. An apparatus comprising:
a closed body having a varied configuration between a first location and at least a second location;
a third location between the first location and the second location; and
a pressure sensor coupled to the closed body at the first location,
wherein, when forces with substantially equal magnitudes are respectively applied to the closed body at the first, second, and third locations, the closed body respectively translates the forces to substantially equal pressure differentials at the first location.

* * * * *

UNITED STATES PATENT AND TRADEMARK OFFICE
CERTIFICATE OF CORRECTION

PATENT NO. : 9,643,554 B2
APPLICATION NO. : 14/226462
DATED : May 9, 2017
INVENTOR(S) : Mahmoud Yousef Ghannam et al.

It is certified that error appears in the above-identified patent and that said Letters Patent is hereby corrected as shown below:

In the Claims

Claim 2, Column 5, Line 8:   delete "and" (first occurrence).

Signed and Sealed this
First Day of May, 2018

Andrei Iancu
*Director of the United States Patent and Trademark Office*